(12) United States Patent
Kawasaki et al.

(10) Patent No.: US 6,549,993 B2
(45) Date of Patent: Apr. 15, 2003

(54) CONTENTS CHECK METHOD, CONTENTS RENEWAL METHOD AND PROCESSING APPARATUS

(75) Inventors: Yusuke Kawasaki, Kawasaki (JP); Hiroshi Sakurai, Kawasaki (JP); Shigeru Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 227 days.

(21) Appl. No.: 09/731,800

(22) Filed: Dec. 8, 2000

(65) Prior Publication Data

US 2002/0002676 A1 Jan. 3, 2002

(30) Foreign Application Priority Data

Jun. 29, 2000 (JP) ........................................ 2000-196476

(51) Int. Cl.⁷ .............................................. G06F 13/14
(52) U.S. Cl. ..................................................... 711/165
(58) Field of Search ......................................... 711/165

(56) References Cited

U.S. PATENT DOCUMENTS 6,009,523 A   12/1999  Owaki et al. ............... 713/200

FOREIGN PATENT DOCUMENTS

JP   WO96/24894   8/1996

OTHER PUBLICATIONS

Patent Abstracts of Japan, Hei 7–44378, Translation Abstract.

Patent Abstracts of Japan, Hei 8–44556, Translation Abstract.

*Primary Examiner*—Kevin L. Ellis
(74) *Attorney, Agent, or Firm*—Staas & Halsey LLP (57) ABSTRACT

In a system having an internal memory storing internal contents wherein an external memory for storing external contents is detachably mounted on said processing apparatus, for performing a processing according to the internal contents stored in said internal memory and the external contents stored in said external memory, a contents check method decides validity of the external contents stored in said external memory. The external contents stored in said external memory involve original check result information representative of a check result associated with validity of the external contents and original check result position information representative of a storage position of the original check result information. The external contents stored in said external memory is checked in accordance with a predetermined check algorithm to obtain a check result. The check result obtained is compared with a check result represented by the original check result information stored in a storage position indicated by the original check result position information to decide validity of the external contents stored in said external memory.

20 Claims, 5 Drawing Sheets

CONTENTS CHECK METHOD, CONTENTS RENEWAL METHOD AND PROCESSING APPARATUS

BACKGROUND OF THE INVENTION

1. Field of the Invention

The present invention relates to a processing apparatus having a memory for storing contents, for example, a processing apparatus having an internal memory for storing internal contents consisting of programs and the like, to which an external memory for storing external contents such as programs and data is detachably mounted, said processing apparatus being for performing a processing according to the internal contents stored in the internal memory and the external contents stored in the external memory, a contents check method of determining validity of the external contents stored in the external memory in the processing apparatus, and a contents renewal method of renewing a module which is a part of the external contents stored in the external memory in the processing apparatus.

2. Description of the Related Art

Hitherto, in an apparatus for performing a processing using LSI chips including CPU, there is known an arrangement in which an internal memory such as ROM and the like is loaded in an LSI chip so that a program, which is universal or less in possibility of renewal, is stored in the internal memory, and an external memory (for example, ROM and flash ROM) is detachable mounted on the LSI chip so that after forwarding of the apparatus, an application program and various sorts of data can be rewritten, and the application program and various sorts of data are stored in the external memory so as to be processed.

However, the apparatus as mentioned above is associated with such a problem that when contents such as programs and data stored in the external memory are unfairly rewritten, or when the external memory is replaced by another memory storing unfair contents, a malicious program is executed, or alternatively even if the program is proper per se, an erroneous processing is performed in accordance with a malicious data.

For example, in the event that the external memory (ROM) of the above-mentioned apparatus loaded on a financial terminal apparatus is unfairly obtained to read a program stored in the external memory through the reverse engineering, and a program code unfairly outputting or storing an entered personal identification number is added in a personal identification number input module in the program so as to be stored in the same type of ROM, and then the ROM is returned to the financial terminal apparatus, it is possible to steal the personal identification number without being noticed by a user.

SUMMARY OF THE INVENTION

In view of the foregoing, it is an object of the present invention to provide a processing apparatus capable of avoiding an execution of an unfair program and an execution of an unfair processing due to an unfair data, a contents check method of checking validity of contents stored in a memory, and a contents renewal method capable of preventing an unfair renewal of contents stored in a memory.

To achieve the above-mentioned objects of the present invention, the present invention provides a contents check method in a processing apparatus having a memory storing contents for performing a processing according to the contents stored in said memory, the contents check method deciding validity of the contents stored in said memory, wherein the contents stored in said memory involve original check result information representative of a check result associated with validity of the contents and original check result position information representative of a storage position of the original check result information, said contents check method comprising:

a check step of checking the contents stored in said memory in accordance with a predetermined check algorithm to obtain a check result; and a comparison step of comparing the check result obtained by said check step with a check result represented by the original check result information stored in a storage position indicated by the original check result position information to decide validity of the contents stored in said memory.

According to the contents check method of the present invention as mentioned above, the contents stored in the memory involve not only the original check result information, but also the original check result position information. This feature makes it possible to reduce a possibility that the original check result information is unfairly known by a third person, as compared with a case where the original check result information is stored in a fixed address. Further, according to the contents check method of the present invention as mentioned above, it is possible to properly decide validity of the contents stored in the memory and thereby effectively preventing unfair program and data from being entered forcibly.

Here, the contents check method of the present invention has typically the following aspects.

That is, to achieve the above-mentioned objects of the present invention, the present invention provides a contents check method in a processing apparatus having an internal memory storing internal contents wherein an external memory for storing external contents is detachably mounted on said processing apparatus, for performing a processing according to the internal contents stored in said internal memory and the external contents stored in said external memory, the contents check method deciding validity of the external contents stored in said external memory, wherein the external contents stored in said external memory involve original check result information representative of a check result associated with validity of the external contents and original check result position information representative of a storage position of the original check result information, said contents check method comprising:

a check step of checking the external contents stored in said external memory in accordance with a predetermined check algorithm to obtain a check result; and a comparison step of comparing the check result obtained by said check step with a check result represented by the original check result information stored in a storage position indicated by the original check result position information to decide validity of the external contents stored in said external memory.

According to the contents check method of the present invention as mentioned above, as mentioned above, the contents stored in the memory involve not only the original check result information, but also the original check result position information. This feature makes it possible to reduce a possibility that the original check result information is unfairly known by a third person, as compared with a case where the original check result information is stored in a fixed address. Further, according to the contents check method of the present invention as mentioned above, it is possible to properly decide validity of the contents stored in the memory and thereby effectively preventing unfair program and data from being entered forcibly.

In the contents check method according to the present invention as mentioned above, it is preferable that the external contents stored in said external memory involve the original check result information and the original check result position information at least one of which is encoded, said contents check method further comprising:

a decoding step of decoding one encoded of the original check result information and the original check result position information.

This feature makes it possible to further reduce a possibility that the original check result information and the storage place are unfairly known by a third person.

In the contents check method according to the present invention as mentioned above, it is preferable that the external contents stored in said external memory involve check area designation information, and said check step checks an check area designated by the check area designation information of the external contents stored in said external memory.

This feature makes it possible to properly decide validity of contents stored in the external memory upon ensuring an rewritable area on the external memory by a user.

In this case, it is preferable that the external contents stored in said external memory involve the check area designation information which is encoded, said contents check method further comprising:

a decoding step of decoding the encoded check area designation information.

This feature makes it possible to prevent unfair contents from being entered forcibly, since it is difficult to identify the check area.

To achieve the above-mentioned objects of the present invention, the present invention provides a contents renewal method in a processing apparatus having a memory storing contents for performing a processing according to the contents stored in said memory, the contents renewal method renewing a module to be renewed, which is part of the contents stored in said memory, into a new renewal module, wherein the contents stored in said memory involve original check result information representative of a check result associated with validity of the contents and original module check result information representative of a check result associated with validity of the renewal module, said contents renewal method comprising:

a module check step of checking the renewal module in accordance with a predetermined check algorithm to obtain a check result;

a comparison step of comparing the check result obtained by said module check step with a check result represented by the original module check result information involved in the renewal module to decide validity of the renewal module;

a correction data producing step of producing correction data in such a manner that a check result, in a case where the contents stored in said memory after the module to be renewed of the contents stored in said memory is renewed into the renewal module involving correction data is checked in accordance with a predetermined algorithm, is coincident with the check result represented by the original check result information involved in the contents; and a module renewal step of renewing the module to be renewed of the contents stored in said memory into the renewal module involving the correction data produced in said correction data producing step in a case where said module check step decides that the renewal module is proper.

According to the program renewal method of the present invention as mentioned above, the combination of the module check step and the module renewal step makes it possible to decide validity of the renewal module.

When the module to be renewed is replaced by a renewal module, the check result of the contents is changed. To cope with this, it is considered that when the module to be renewed is renewed into a renewal module, the original check result information of the contents stored in the memory is rewritten when the module to be renewed is renewed into the renewal module. However, such a renewal needs a rewriting of the original check result information every renewal. This is associated with a high possibility that a storage address of the original check result information is known by an unfair observer of the access of the contents.

On the contrary, according to the present invention, correction data is produced in the correction data producing step, and the correction data is written together with the renewal module on the memory. Thus, there is no need to rewrite the original check result information of the contents which are stored in the memory, and thereby greatly reduce danger that the storage place of the original check result information is unfairly known.

Here, the contents renewal method of the present invention has typically the following aspects.

That is, to achieve the above-mentioned objects of the present invention, the present invention provides a contents renewal method in a processing apparatus having an internal memory storing internal contents wherein an external memory for storing external contents is detachably mounted on said processing apparatus, for performing a processing according to the internal contents stored in said internal memory and the external contents stored in said external memory, the contents renewal method renewing a module to be renewed, which is part of the contents stored in said external memory, into a new renewal module, wherein the contents stored in said external memory involve original check result information representative of a check result associated with validity of the external contents and original module check result information representative of a check result associated with validity of the renewal module, said contents renewal method comprising:

a module check step of checking the renewal module in accordance with a predetermined check algorithm to obtain a check result;

a comparison step of comparing the check result obtained by said module check step with a check result represented by the original module check result information involved in the renewal module to decide validity of the renewal module;

a correction data producing step of producing correction data in such a manner that a check result, in a case where the external contents stored in said external memory after the module to be renewed of the external contents stored in said external memory is renewed into the renewal module involving correction data is checked in accordance with a predetermined algorithm, is coincident with the check result represented by the original check result information involved in the external contents; and a module renewal step of renewing the module to be renewed of the external contents stored in said external memory into the renewal module involving the correction data produced in said correction data producing step in a case where said module check step decides that the renewal module is proper.

According to the program renewal method of the present invention as mentioned above, the combination of the module check step and the module renewal step makes it possible to decide validity of the renewal module.

When the module to be renewed is replaced by a renewal module, the check result of the external contents is changed. To cope with this, it is considered that when the module to be renewed is renewed into a renewal module, the original check result information of the external contents stored in the external memory is rewritten when the module to be renewed is renewed into the renewal module. However, such a renewal needs a rewriting of the original check result information every renewal. This is associated with a high possibility that a storage address of the original check result information is known by an unfair observer of the access of the contents.

On the contrary, according to the present invention, correction data is produced in the correction data producing step, and the correction data is written together with the renewal module on the external memory. Thus, there is no need to rewrite the original check result information of the external contents which are stored in the external memory, and thereby greatly reduce danger that the storage place of the original check result information is unfairly known.

In the contents renewal method according to the present invention as mentioned above, it is preferable that the renewal module involves the original module check result information which is encoded, said contents renewal method further comprising:

a decoding step of decoding the encoded original module check result information.

This feature makes it possible to effectively prevent an unfair module from being entered forcibly.

In this case, it is preferable that the external contents stored in said external memory involve a key for decoding the encoded original module check result information, and said decoding step decodes the encoded original module check result information by said key.

Further, it is preferable that the external contents stored in said external memory involve the key which is encoded, said decoding step decodes the encoded original module check result information with the key which is read from said external memory and is decoded.

This feature makes it further difficult that the unfair module enters forcibly.

To achieve the above-mentioned objects of the present invention, the present invention provides a first processing apparatus having a memory storing contents for performing a processing according to the contents stored in said memory, wherein the contents stored in said memory involve original check result information representative of a check result associated with validity of the contents and original check result position information representative of a storage position of the original check result information, said processing apparatus comprising:

a check section for checking the contents stored in said memory in accordance with a predetermined check algorithm to obtain a check result; and a comparison section for comparing the check result obtained by said check section with a check result represented by the original check result information stored in a storage position indicated by the original check result position information to decide validity of the contents stored in said memory.

Here, the first processing apparatus of the present invention has typically the following aspects.

That is, to achieve the above-mentioned objects of the present invention, the present invention provides a first processing apparatus having an internal memory storing internal contents wherein an external memory for storing external contents is detachably mounted on said processing apparatus, for performing a processing according to the internal contents stored in said internal memory and the external contents stored in said external memory, wherein the external contents stored in said external memory involve original check result information representative of a check result associated with validity of the external contents and original check result position information representative of a storage position of the original check result information, said processing apparatus comprising:

a check section for checking the external contents stored in said external memory in accordance with a predetermined check algorithm to obtain a check result; and a comparison section for comparing the check result obtained by said check section with a check result represented by the original check result information stored in a storage position indicated by the original check result position information to decide validity of the external contents stored in said external memory.

In the first processing apparatus according to the present invention as mentioned above, it is preferable that the external contents stored in said external memory involve the original check result information and the original check result position information at least one of which is encoded, said processing apparatus further comprising:

a decoding section for decoding one encoded of the original check result information and the original check result position information.

Further, in the first processing apparatus according to the present invention as mentioned above, it is preferable that the external contents stored in said external memory involve check area designation information, and said check section checks an check area designated by the check area designation information of the external contents stored in said external memory.

In this case, it is preferable that the external contents stored in said external memory involve the check area designation information which is encoded, said processing apparatus further comprising:

a decoding section for decoding the encoded check area designation information.

To achieve the above-mentioned objects of the present invention, the present invention provides a second processing apparatus having a memory storing contents for performing a processing according to the contents stored in said memory, wherein the contents stored in said memory involve original check result information representative of a check result associated with validity of the contents, said processing apparatus comprising:

a renewal module obtaining section for obtaining a renewal module involving original module check result information representative of a check result associated with validity of the renewal module, said renewal module being to be substituted for a module to be renewed which is part of the contents stored in said memory;

a module check section for checking the renewal module obtained in said renewal module obtaining section in accordance with a predetermined check algorithm to obtain a check result;

a comparison section for comparing the check result obtained by said module check step with a check result represented by the original module check result information involved in the renewal module to decide validity of the renewal module;

a correction data producing section for producing correction data in such a manner that a check result, in a case where the contents stored in said memory after the module to be renewed of the contents stored in said memory is renewed into the renewal module involving correction data is checked in accordance with a predetermined algorithm, is coincident with the check result represented by the original check result information involved in the contents; and a module renewal section for renewing the module to be renewed of the contents stored in said memory into the renewal module involving the correction data produced in said correction data producing section in a case where said module check step decides that the renewal module is proper.

Here, the second processing apparatus of the present invention has typically the following aspects.

That is, to achieve the above-mentioned objects of the present invention, the present invention provides a second processing apparatus having an internal memory storing internal contents wherein an external memory for storing external contents is detachably mounted on said processing apparatus, for performing a processing according to the internal contents stored in said internal memory and the external contents stored in said external memory, wherein the external contents stored in said external memory involve original check result information representative of a check result associated with validity of the external contents, said processing apparatus comprising:

a renewal module obtaining section for obtaining a renewal module involving original module check result information representative of a check result associated with validity of the renewal module, said renewal module being to be substituted for a module to be renewed which is part of the external contents stored in said memory;

a module check section for checking the renewal module in accordance with a predetermined check algorithm to obtain a check result;

a comparison section for comparing the check result obtained by said module check section with a check result represented by the original module check result information involved in the renewal module to decide validity of the renewal module;

a correction data producing section for producing correction data in such a manner that a check result, in a case where the external contents stored in said external memory after the module to be renewed of the external contents stored in said external memory is renewed into the renewal module involving correction data is checked in accordance with a predetermined algorithm, is coincident with the check result represented by the original check result information involved in the external contents; and a module renewal section for renewing the module to be renewed of the external contents stored in said external memory into the renewal module involving the correction data produced in said correction data producing step in a case where said module check step decides that the renewal module is proper.

In the second processing apparatus according to the present invention as mentioned above, it is preferable that the renewal module involves the original module check result information which is encoded, said processing apparatus further comprising:

a decoding section for decoding the encoded original module check result information.

In this case, it is preferable that the external contents stored in said external memory involve a key for decoding the encoded original module check result information, and said decoding section decodes the encoded original module check result information by said key.

Further, in this case, it is preferable that the external contents stored in said external memory involve the key which is encoded, said decoding section decodes the encoded original module check result information with the key which is read from said external memory and is decoded.

BRIEF DESCRIPTION OF THE DRAWINGS

FIG. 3 is a flowchart useful for understanding a program check program to be executed in CPU when a power supply of the apparatus turns on.

DETAILED DESCRIPTION OF PREFERRED EMBODIMENTS

Embodiments of the present invention will be described with reference to the accompanying drawings.

Figure 1:
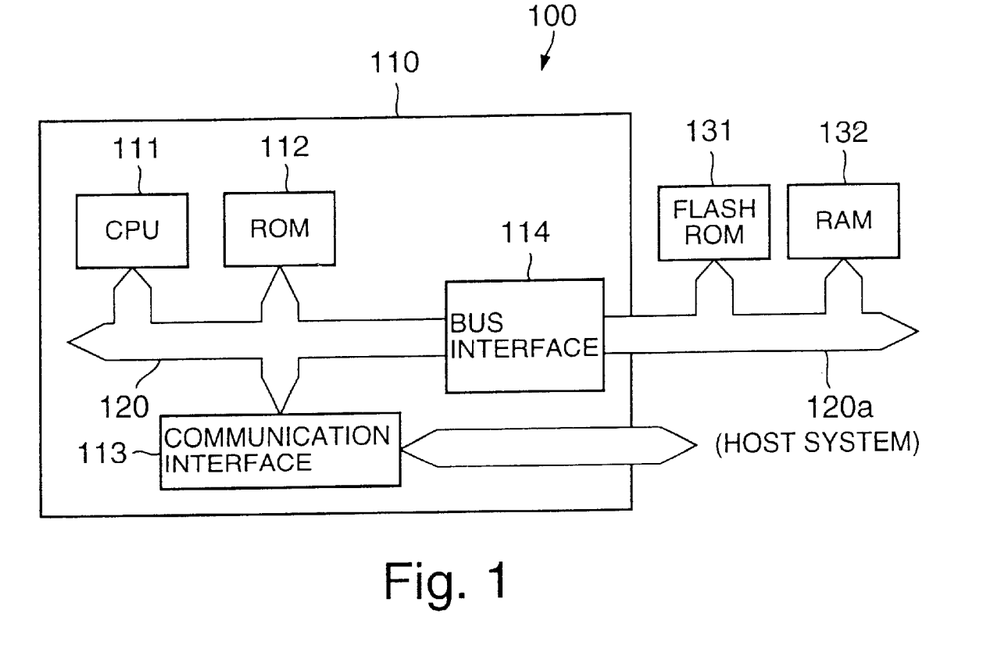
FIG. 1 is a hardware structural view of a processing apparatus according to an embodiment of the present invention.

FIG. 1 is a hardware structural view of a processing apparatus according to an embodiment of the present invention. A processing apparatus according to an embodiment of the present invention comprises a hardware shown in FIG. 1 and a program to be executed in CPU.

A processing apparatus 100 shown in FIG. 1 comprises a portion mounted inside an LSI chip 110 an a portion detachably mounted outside the LSI chip 110. Inside the LSI chip 110, there is provided a CPU 111 for carrying out a program, ROM 112 for storing an internal program to be executed in the CPU 111, and a communication interface 113 for carrying out communication with a host system. Those are mutually connected with one another through a bus 120 so as to be able to communicate with each other. Inside the LSI chip 110, there is provided a bus interface 114 connected to the bus 120 which is extended via the bus interface 114 to the exterior of the LSI chip 110. A portion 120a extended to the exterior of the LSI chip 110 of the bus 120 is connected to a flash ROM 131 and a RAM 132.

Incidentally, while the LSI chip 110 includes further various sorts of elements, those are unnecessary for the explanation of the present embodiment. Thus, the illustration and the explanation will be omitted.

The flash ROM 131 stores therein an external program which is executed by the CPU 111 via the bus interface 114. The RAM 132 is used as a work area when a program is executed, and also used as a temporal storage for a renewal module which will be explained hereinafter.

ROM 112, which is provided inside the LSI chip 110, stores an OS (operation system) and an application program which needs to be rewritten. On the other hand, the flash ROM 131 stores an application program an application program which is to be rewritten as the occasion demands.

Hereinafter, there will be explained the present embodiment in such a way that situations are divided into two cases one of which is directed to a case where an external program, which is to be stored in the flash ROM 131, is downloaded in its entirety from a host system, and another is directed to a case where an external program is already stores in the flash ROM 131, and a program segment (a renewal module) for rewriting part (a module to be renewed) of the external program is downloaded from a host system.

Figure 2:
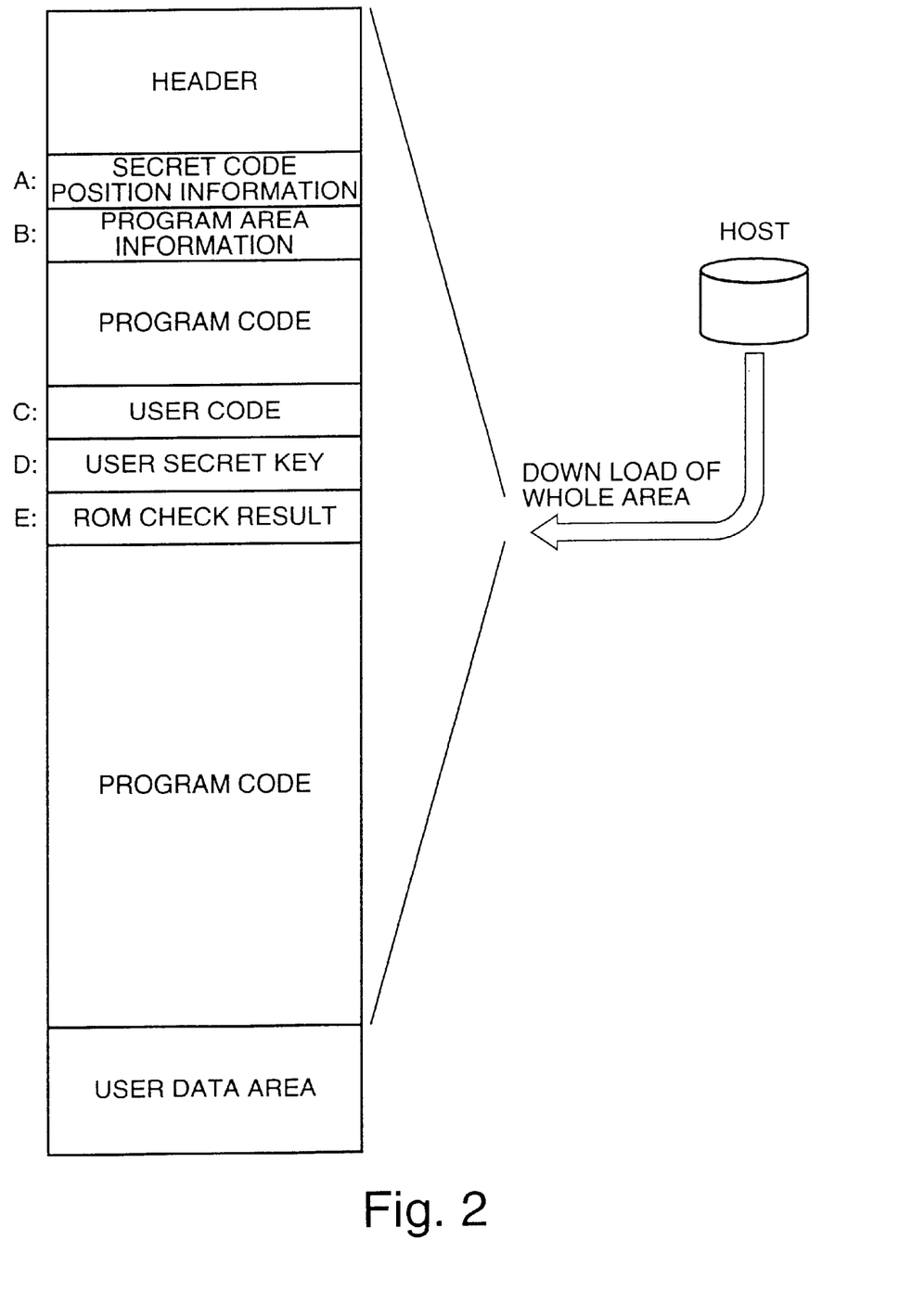
FIG. 2 is a view showing a memory map of an external program when the external program is downloaded in its entirety from a host system.

FIG. 2 is a view showing a memory map of an external program when the external program is downloaded in its entirety from a host system.

When the external program is downloaded in its entirety from a host system, the external program is taken into the inside of the apparatus through the communication interface 113 shown in FIG. 1 and is stored in the flash ROM 131.

The external program stored in the flash ROM 131 consists of, as shown in FIG. 2, a header, secret code position information (it happens that this is noted as 'A'), program area information (it happens that this is noted as 'B'), a program code, a user code which is located in an area of the program code, a user secret key, a ROM check result, and a user data area.

The "header" stores therein information concerning a system constitution of the processing apparatus according to the present embodiment. This part is unnecessary for the aspect of the processing apparatus according to the present embodiment, and thus redundant explanation will be omitted.

The "secret code position information" and the "program area information" are stored in predetermined addresses of the external memory, respectively. The "secret code position information" indicates storage addresses for the "user cod", the "user secret key" and the "ROM check result". The "program area information" indicates the final address of the program code.

The "program code" is a portion which is executed by the COU 111 and is located in the area thereof. The "user code" indicates information for identifying a user of the processing apparatus. The "user secret key" indicates information for a key used in decoding which will be described later. The "ROM check result" indicates information representative of a proper check result in the event that when the external program shown in FIG. 2 is a proper external program, the external program is checked in accordance with a predetermined check algorithm. As will be explained later, the external program shown in FIG. 2 is checked, and the check result is referred to the "ROM check result" described in the external program. When both the check results are coincident with each other, it is decided that the external program is proper. To check the external program, a check is performed on an area from the top of the "header" to the end of the program code indicated by the "program area information".

The "user data area" is an area which is rewritable by a user of the processing apparatus. according to the processing apparatus, validity of the external program stored in the flash ROM 131 (cf. FIG. 1) is checked whenever a power supply of the processing apparatus turns on. Therefore, an inclusion of the user data area into an object of a check brings about a result of an erroneous decision when a check is performed after the user data area is rewritten.

For this reason, according to the present embodiment, the user data area is excluded from an object of a check. This feature makes it possible to perform a data writing into the user data area.

Here, of the memory map shown in FIG. 2, A: secret code position information, B: program area information, D: a user secret key, and E: a ROM check result are embedded in the external program in the form that they are encoded.

According to the present embodiment, validity of the external program stored in the flash ROM 131 is checked whenever the power supply of the processing apparatus turns on. The reason why this is to do so is that there is a possibility that when the power supply of the processing apparatus turns off, the flash ROM 131 is replaced by another flash ROM storing an improper program.

Figure 3:
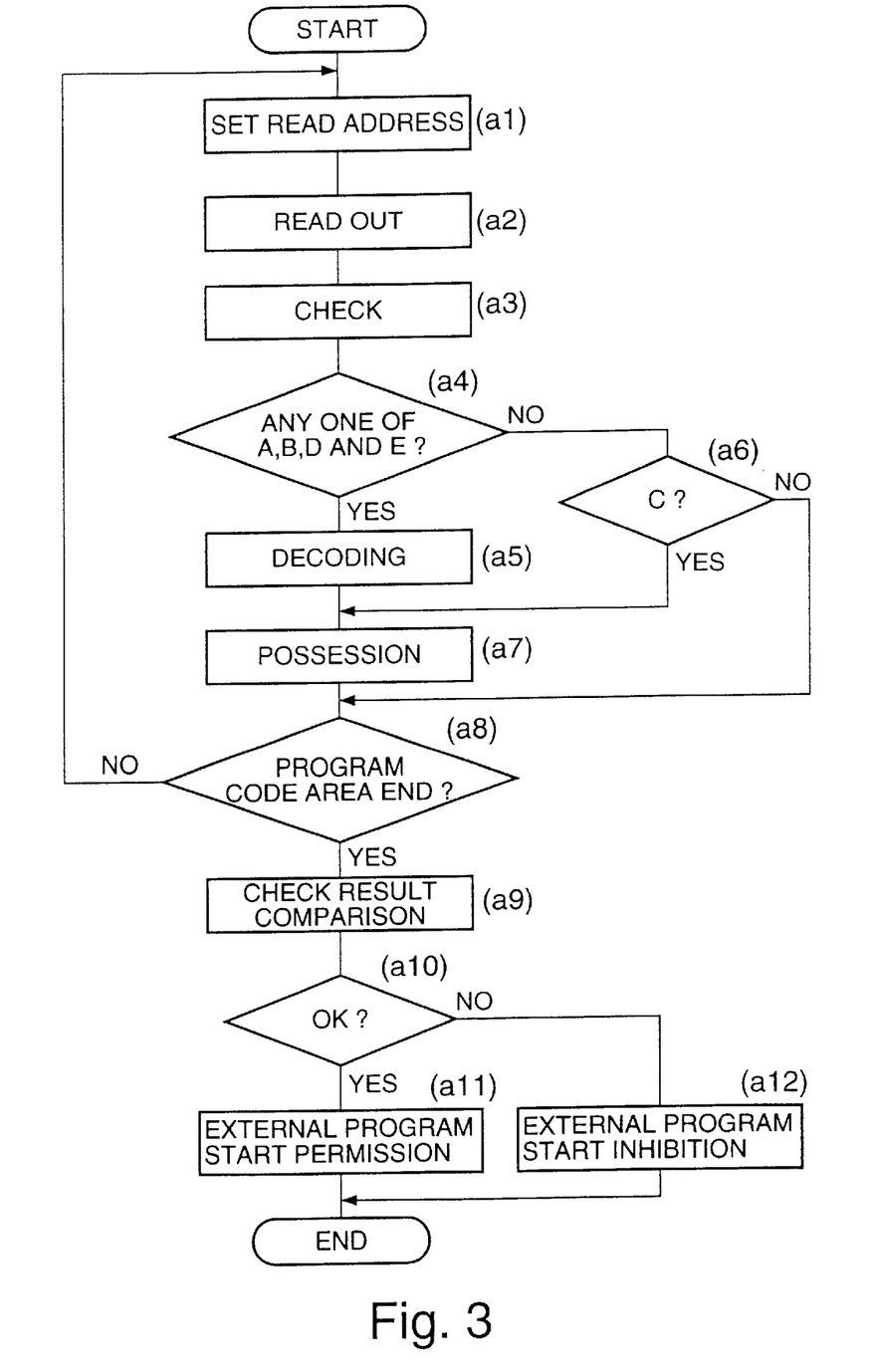

FIG. 3 is a flowchart useful for understanding a program check program to be executed in CPU 111 when a power supply of the apparatus turns on. This program check program is stored in the ROM 112 provided on the LSI chip 110 shown in FIG. 1. The program check program shown in FIG. 3 is concerned with an embodiment of a program check method according to the present invention, and the combination of the program check program shown in FIG. 3 with the hardware shown in FIG. 1 corresponds to an embodiment of the first processing apparatus of the present invention.

Execution of the program shown in FIG. 3 performs a check of validity of the external program of the structure shown in FIG. 3, which is stored in the flash ROM 131.

When the execution of the program shown in FIG. 3 is initiated, a read address of the flash ROM 131 is set up (step a1). The read address is first set up for a first address of the header in the memory map shown in FIG. 2, and then set up for the subsequent addresses sequentially incremented one by one step.

Next, contents of the read address are read out (step a2), a check as to the contents thus read out is performed (step a3). The check in the step a3 involves an integration of checks of read out contents while steps a1 to a8 are repeated. According to the check in the step a3, in the event that it is decided that the external program is a proper external program through a result of integration of the checks of read out contents when it is decided that the check is finally performed up to the terminal of the program code area in the step a8, it is possible to obtain a check result coincident with the "ROM check result" in the memory map shown in FIG. 2.

Next, in step a4, it is determined whether the one now read out is any one of A: secret code position information, B: program area information, D: a user secret key, and E: a ROM check result. Those are embedded in the external program in the form that they are encoded. And thus, in the event that the one now read out is any one of those items, a decoding is performed as to the read out contents (step a5). The decoding in the step a5 is performed using a key which is previously stored in the ROM 112 provided inside the LSI chip 110. This key have nothing to do with the "user secret key" shown in FIG. 2.

The data thus decoded and C: user code (step a6) are saved inside, and access for the flash ROM 131 is performed no longer until the power supply turns on again to execute the program shown in FIG. 3. The reason why this is to do so is that permission of the access for a plurality of number of times will give a hint to an unfair decoder (person).

When the above-mentioned steps are sequentially performed from the first address of the flash ROM 131 to the last address of the program code shown in FIG. 2 (step a8), the check results obtained and integrated in the step a3 and the ROM check result encoded shown in FIG. 2 are read out and decoded so that the check results thus obtained are referred to each other (step a9). As a result, when it is decided that both the check results are coincident with one another (step a10), there is provided a state that a start of the external program stored in the flash ROM 131 is permitted, for example, in such a manner that an access permission flag for permitting an access of the flash ROM 131 is established (step a11). On the other hand, when it is decided that both the check results are not coincident with one another (step a10), there is provided a state that a start of the external program stored in the flash ROM 131 is inhibited, for example, in such a manner that an access permission flag for permitting an access of the flash ROM 131 is turned off (step a12), so that the operation mode is switched to a mode in which the CPU 111 performs only execution of the program stored in the ROM 112.

According to the present embodiment, in the manner as mentioned above, validity of the external program stored in the flash ROM 131 is determined.

Figure 4:
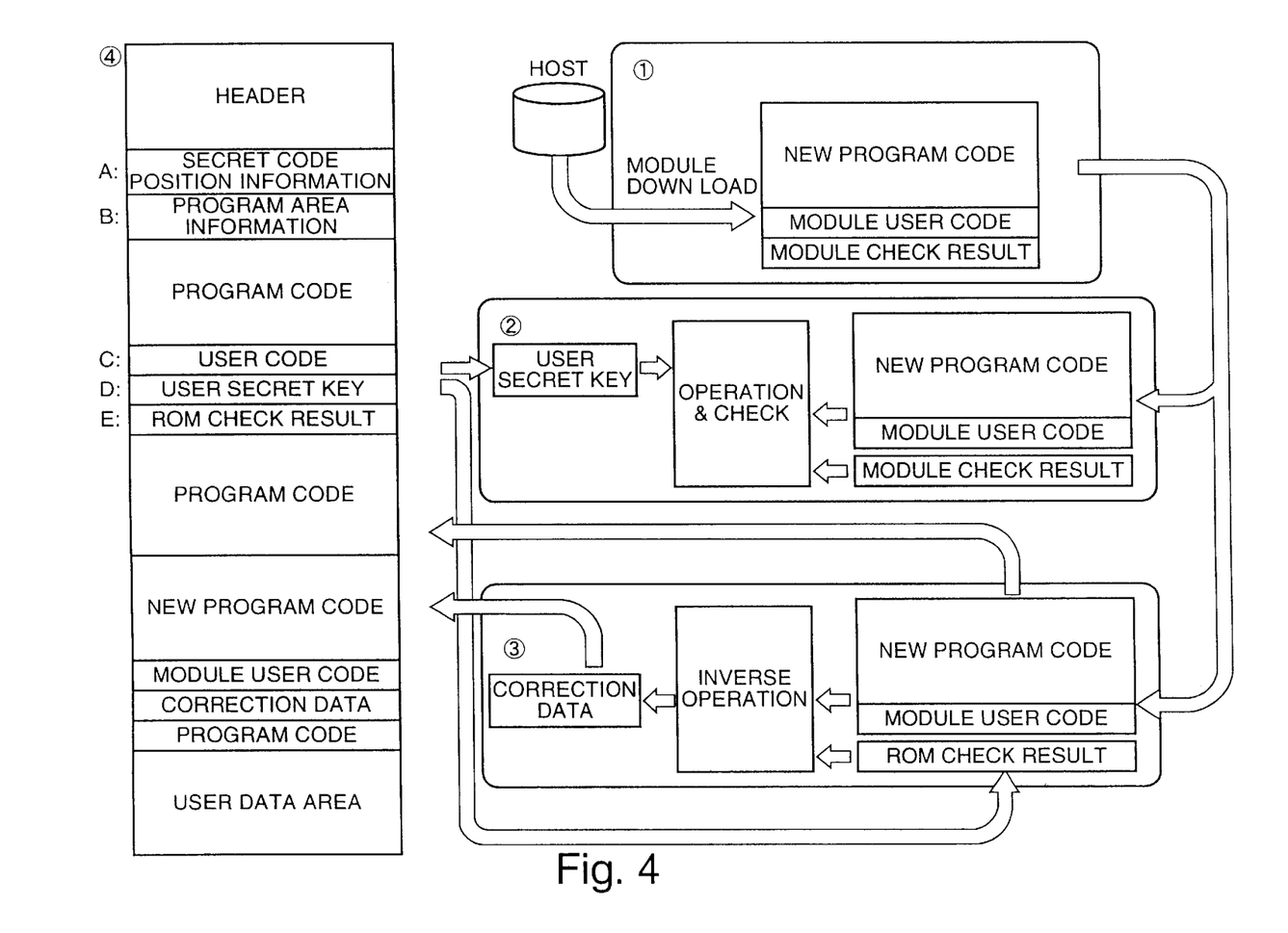
FIG. 4 is a view showing a handling of a renewal module downloaded from a host system, and a memory map of an external program renewed by the renewal module.

FIG. 4 is a view showing a handling of a renewal module downloaded from a host system, and a memory map of an external program renewed by the renewal module.

The flash ROM 131 shown in FIG. 1 already stores the external program, and it has been confirmed by the algorithm explained referring to FIGS. 2 and 3 that the external program is proper. A renewal module now down loaded from the host system is one which is down loaded so as to renew a program to be renewed which is a part of the external program already stored in the flash ROM 131. The renewal module down loaded is not immediately stored in the flash ROM 131, but temporarily stored in the RAM 132, and then after a decision according to the procedure which will be explained later, stored in the flash ROM 131 with replacement of the program to be renewed by the renewal module of the external program stored in the flash ROM 131.

The renewal module down loaded from the host system comprises a new program code for performing a processing of the module and a module user code representative of a user of the renewal module, and is applied with a module check result. The module check result is information representative of a proper check result when the renewal module is checked using a predetermined check algorithm in the even that the renewal module is a proper renewal module. The module check result is applied to the renewal module in a state that it is encoded.

Figure 5:
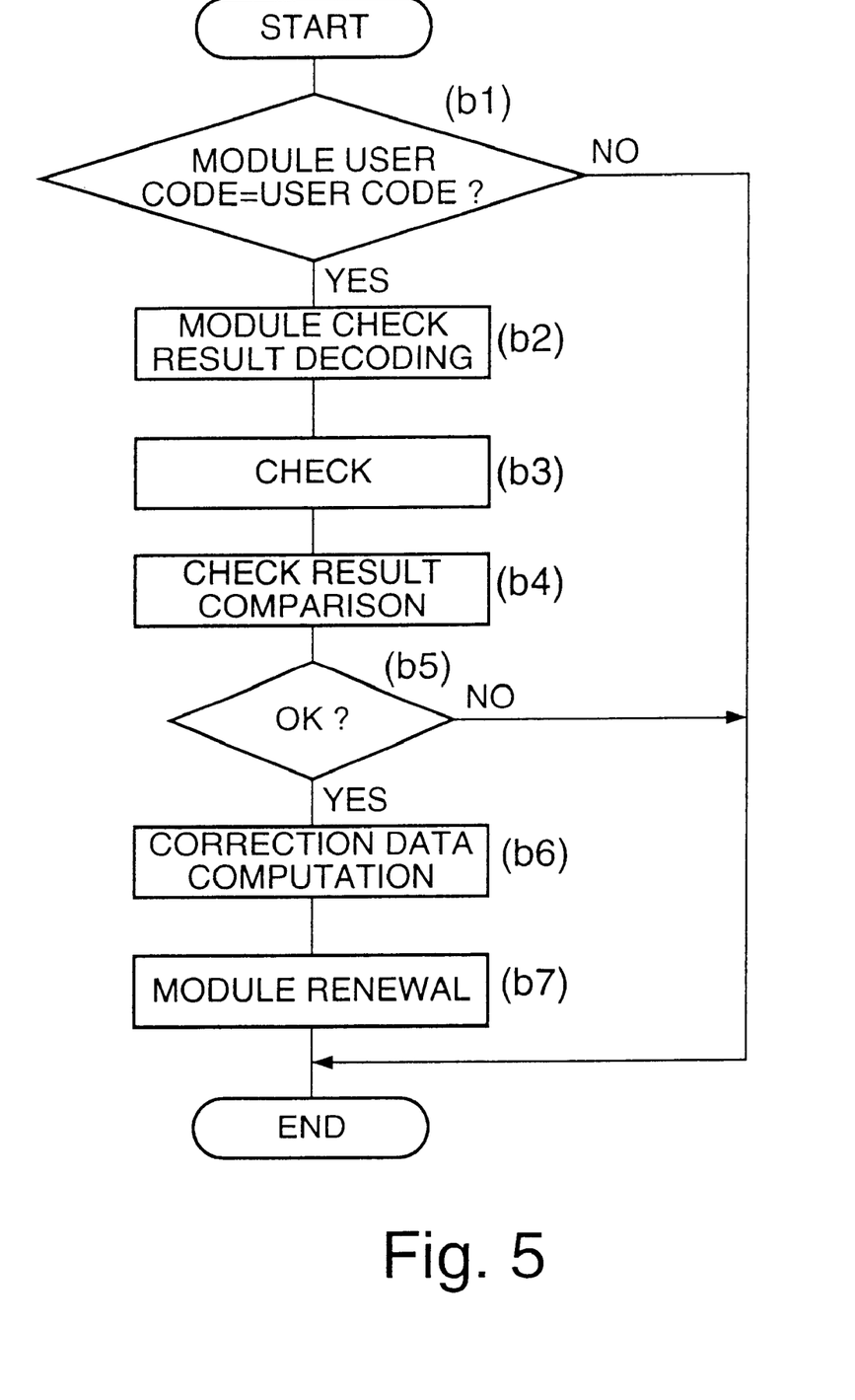
FIG. 5 is a flowchart useful for understanding a module renewal program.

FIG. 5 is a flowchart useful for understanding a module renewal program which is started when a renewal module is down loaded and stored in the RAM 132. Hereinafter, the explanation will be continued referring to FIG. 5 together with FIG. 4. A module renewal program shown in FIG. 5 is stored in the ROM 112 provided inside the LSI chip 110 shown in FIG. 1. This module renewal program shown in FIG. 5 is an embodiment of a program renewal method of the present invention, and corresponds to an embodiment of a second processing apparatus of the present invention in combination with the hardware shown in FIG. 1.

When a renewal program is down loaded from the host system (cf. ① of FIG. 4), the down loaded renewal program is temporarily stored in the RAM 132 shown in FIG. 1, and then the module renewal program shown in FIG. 5 starts.

In the module renewal program shown in FIG. 5, first, a module user code of a renewal module is compared with a user code (cf. FIG. 2) of the external program stored in the flash ROM 131, which is an object to be renewed, and it is decided whether they are coincident with one another.

When it is decided that they are not coincident with one another, the validity decision processing is performed no longer with respect to the renewal program, and also it is not performed that the renewal program is written into the flash ROM 131. Thus the process passes through the flow. That is, the renewal program is discarded.

As a result of a decision of step b1, when it is decided that the module user code and the user code are coincident with one another, arithmetic operation and check for determination of the following validity are performed (cf. ② of FIG. 4).

That is, the "module check result" of the renewal program is applied to the renewal program in a state that it is encoded. Thus, the decoding of the module check result is performed (step b2). To perform the decoding of the module check result, the "user secret key" in the external program stored in the flash ROM 131 is used. The "user secret key" in the external program is one encoded. On the other hand, the "user secret key", which is used for decoding the "module check result", is decoded in step b5 of the program check program shown in FIG. 3 for determining validity of the external program and is saved in a state that it is decoded.

In the step b2 of the program of FIG. 5, the "module check result" is decoded by the "user secret key" in a state that it is decoded.

Next, the renewal module is checked in accordance with a predetermined check algorithm (step b3), so that a check result thus obtained is compared with a check result obtained through decoding of the "module check result" (step b4).

When those check results are not coincident with one another (step b5), in a similar fashion to a case where in the step b1 it is decided that the module user code and the user code are not coincident with one another, the renewal module is not adopted and is discarded.

On the other hand, in the step b5 when it is decided that those check results are coincident with one another, the process goes to step b6 in which a computation of correction data is performed.

It is assumed that the correction data is, as shown in ④ of FIG. 4, one in which a predetermined module to be renewed of the external program stored in the flash ROM 131 is replaced by a renewal module (a new program code and a module user code) and correction data which are stored in the flash ROM 131. The correction data is determined by an inverse operation according to the renewal module and the "ROM check result" in a state that it is decoded in such a manner that a check result, in a case where the external program renewed in accordance with the flow of FIG. 3 is checked from the top of the header to one (the terminal of the program code) immediately before an user data area in a predetermined algorithm, is coincident with the "ROM check result" embedded in the external program (since the "ROM check result" in the external program is encoded, here, the "ROM check result" decoded in the step a5 in FIG. 3).

When a computation of the correction data according to the inverse operation is performed, the renewal module including the computed correction data is stored instead of the program to be renewed which is to be replaced by the present renewal module, of the external program stored in the flash ROM 131. Hereinafter, the external program, which is replaced by the renewal program, is executed.

When the module to be renewed is replaced by a renewal module, the check result for the external program is changed. To cope with this, it is considered that when the module to be renewed is renewed into a renewal module, the "ROM check result" in the external program is rewritten. However, such a rewriting of the "ROM check result" needs a rewriting of the "ROM check result" every renewal. This is associated with a high possibility that a storage address of the "ROM check result" is known by an unfair decoder (person).

On the contrary, according to the present embodiment, even if the renewal is performed, the "ROM check result" is not changed, and thus this makes it difficult to perform an unfair decoding.

Incidentally, according to the present embodiment as mentioned above, a combination of the "new program code" and the "module user code" is stored in the flash ROM 131 in form of the renewal module. However, it is acceptable that only the "new program code" is stored in the flash ROM 131 in form of the renewal module, or alternatively, it is acceptable that a combination of the "new program code", the "module user code", and further the "module check result" is stored in the flash ROM 131 in form of the renewal module. The correction data is varied in accordance with a selection between those renewal modules.

According to the present embodiment as mentioned above, there is provided such a system arrangement that the flash ROM is detachably mounted so that the external program is rewritable. On the other hand, also in an arrangement in which non-rewritable ROM is detachably mounted, a program check method of the present invention and a first processing apparatus of the present invention can be applied.

Further, according to the present embodiment as mentioned above, the renewal module is temporarily stored in the detachably mounted RAM, it is acceptable that the LSI chip 110 is provided with a RAM, and the RAM is adopted as a temporal storage place for the renewal module.

Furthermore, according to the present embodiment as mentioned above, the memory which is loaded on the same LSI chip as the CPU is referred to as the "internal memory", and the memory which is detachably mounted on the exterior of the LSI chip is referred to as the "external memory". However, the "internal memory" and the "external memory" referred to in the present invention are not restricted to the above-mentioned concept. For example, even if it is concerned with a memory which is loaded on an LSI chip other than the LSI on which CPU is loaded, it is acceptable that a memory existing within the same package is referred to as the "internal memory", and a memory detachably mounted on the exterior of the package is referred to as the "external memory". Or alternatively, even if a package is different, it is acceptable that a memory, which exists together with CPU within a certain apparatus, is referred to as the "internal memory", and a memory, which is connected to the exterior of the apparatus, is referred to as the "external memory".

Still further, there is no need for the present invention to make a distinction between the "internal memory" and the "external memory". The present invention is applicable to a processing apparatus simply provided with a "memory" without such a distinction.

Still furthermore, according to the present embodiment as mentioned above, while it has been explained that the detachably mounted flash ROM 131 stores therein a program, it is acceptable that the flash ROM 131 stores therein data which is referred to with a program stored in the ROM 112 inside the LSI chip 110, and validity of the data and validity of the module consisting of renewal data when part of the data is renewed are determined.

As mentioned above, according to the present invention, even if programs and data are stored in a memory, it is possible to protect the programs and data from an act of reverse engineering and the like by a third person and thereby obtaining a higher security as compared with the prior art.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. In a processing apparatus having a memory storing contents for performing a processing according to the contents stored in said memory, a contents check method of deciding validity of the contents stored in said memory,
wherein the contents stored in said memory involve original check result information representative of a check result associated with validity of the contents and original check result position information representative of a storage position of the original check result information, said contents check method comprising:
a check step of checking the contents stored in said memory in accordance with a predetermined check algorithm to obtain a check result; and
a comparison step of comparing the check result obtained by said check step with a check result represented by the original check result information stored in a storage position indicated by the original check result position information to decide validity of the contents stored in said memory.

2. In a processing apparatus having an internal memory storing internal contents wherein an external memory for storing external contents is detachably mounted on said processing apparatus, for performing a processing according to the internal contents stored in said internal memory and the external contents stored in said external memory, a contents check method of deciding validity of the external contents stored in said external memory,
wherein the external contents stored in said external memory involve original check result information representative of a check result associated with validity of the external contents and original check result position information representative of a storage position of the original check result information, said contents check method comprising:
a check step of checking the external contents stored in said external memory in accordance with a predetermined check algorithm to obtain a check result; and
a comparison step of comparing the check result obtained by said check step with a check result represented by the original check result information stored in a storage position indicated by the original check result position information to decide validity of the external contents stored in said external memory.

3. A contents check method according to claim 2 wherein the external contents stored in said external memory involve the original check result information and the original check result position information at least one of which is encoded, said contents check method further comprising:

a decoding step of decoding one encoded of the original check result information and the original check result position information.

4. A contents check method according to claim 2 wherein the external contents stored in said external memory involve check area designation information, and said check step checks an check area designated by the check area designation information of the external contents stored in said external memory.

5. A contents check method according to claim 4 wherein the external contents stored in said external memory involve the check area designation information which is encoded, said contents check method further comprising:

a decoding step of decoding the encoded check area designation information.

6. In a processing apparatus having a memory storing contents for performing a processing according to the contents stored in said memory, a contents renewal method of renewing a module to be renewed, which is part of the contents stored in said memory, into a new renewal module, wherein the contents stored in said memory involve original check result information representative of a check result associated with validity of the contents and original module check result information representative of a check result associated with validity of the renewal module, said contents renewal method comprising:

a module check step of checking the renewal module in accordance with a predetermined check algorithm to obtain a check result;

a comparison step of comparing the check result obtained by said module check step with a check result represented by the original module check result information involved in the renewal module to decide validity of the renewal module;

a correction data producing step of producing correction data in such a manner that a check result, in a case where the contents stored in said memory after the module to be renewed of the contents stored in said memory is renewed into the renewal module involving correction data is checked in accordance with a predetermined algorithm, is coincident with the check result represented by the original check result information involved in the contents; and a module renewal step of renewing the module to be renewed of the contents stored in said memory into the renewal module involving the correction data produced in said correction data producing step in a case where said module check step decides that the renewal module is proper.

7. In a processing apparatus having an internal memory storing internal contents wherein an external memory for storing external contents is detachably mounted on said processing apparatus, for performing a processing according to the internal contents stored in said internal memory and the external contents stored in said external memory, a contents renewal method of renewing a module to be renewed, which is part of the contents stored in said external memory, into a new renewal module, wherein the contents stored in said external memory involve original check result information representative of a check result associated with validity of the external contents and original module check result information representative of a check result associated with validity of the renewal module, said contents renewal method comprising:

a module check step of checking the renewal module in accordance with a predetermined check algorithm to obtain a check result;

a comparison step of comparing the check result obtained by said module check step with a check result represented by the original module check result information involved in the renewal module to decide validity of the renewal module;

a correction data producing step of producing correction data in such a manner that a check result, in a case where the external contents stored in said external memory after the module to be renewed of the external contents stored in said external memory is renewed into the renewal module involving correction data is checked in accordance with a predetermined algorithm, is coincident with the check result represented by the original check result information involved in the external contents; and a module renewal step of renewing the module to be renewed of the external contents stored in said external memory into the renewal module involving the correction data produced in said correction data producing step in a case where said module check step decides that the renewal module is proper.

8. A contents renewal method according to claim 7 wherein the renewal module involves the original module check result information which is encoded, said contents is renewal method further comprising:

a decoding step of decoding the encoded original module check result information.

9. A contents renewal method according to claim 8 wherein the external contents stored in said external memory involve a key for decoding the encoded original module check result information, and said decoding step decodes the encoded original module check result information by said key.

10. A contents renewal method according to claim 9 wherein the external contents stored in said external memory involve the key which is encoded, said decoding step decodes the encoded original module check result information with the key which is read from said external memory and is decoded.

11. A processing apparatus having a memory storing contents for performing a processing according to the contents stored in said memory, wherein the contents stored in said memory involve original check result information representative of a check result associated with validity of the contents and original check result position information representative of a storage position of the original check result information, said processing apparatus comprising:

a check section for checking the contents stored in said memory in accordance with a predetermined check algorithm to obtain a check result; and a comparison section for comparing the check result obtained by said check section with a check result represented by the original check result information stored in a storage position indicated by the original check result position information to decide validity of the contents stored in said memory.

12. A processing apparatus having an internal memory storing internal contents wherein an external memory for storing external contents is detachably mounted on said processing apparatus, for performing a processing according to the internal contents stored in said internal memory and the external contents stored in said external memory, wherein the external contents stored in said external memory involve original check result information representative of a check result associated with validity of the external contents and original check result position information representative of a storage position of the original check result information, said processing apparatus comprising:

- a check section for checking the external contents stored in said external memory in accordance with a predetermined check algorithm to obtain a check result; and
- a comparison section for comparing the check result obtained by said check section with a check result represented by the original check result information stored in a storage position indicated by the original check result position information to decide validity of the external contents stored in said external memory.

13. A processing apparatus according to claim 12 wherein the external contents stored in said external memory involve the original check result information and the original check result position information at least one of which is encoded, said processing apparatus further comprising:

- a decoding section for decoding one encoded of the original check result information and the original check result position information.

14. A processing apparatus according to claim 12 wherein the external contents stored in said external memory involve check area designation information, and said check section checks an check area designated by the check area designation information of the external contents stored in said external memory.

15. A processing apparatus according to claim 14 wherein the external contents stored in said external memory involve the check area designation information which is encoded, said processing apparatus further comprising:

- a decoding section for decoding the encoded check area designation information.

16. A processing apparatus having a memory storing contents for performing a processing according to the contents stored in said memory, wherein the contents stored in said memory involve original check result information representative of a check result associated with validity of the contents, said processing apparatus comprising:
- a renewal module obtaining section for obtaining a renewal module involving original module check result information representative of a check result associated with validity of the renewal module, said renewal module being to be substituted for a module to be renewed which is part of the contents stored in said memory;
- a module check section for checking the renewal module obtained in said renewal module obtaining section in accordance with a predetermined check algorithm to obtain a check result;
- a comparison section for comparing the check result obtained by said module check step with a check result represented by the original module check result information involved in the renewal module to decide validity of the renewal module;
- a correction data producing section for producing correction data in such a manner that a check result, in a case where the contents stored in said memory after the module to be renewed of the contents stored in said memory is renewed into the renewal module involving correction data is checked in accordance with a predetermined algorithm, is coincident with the check result represented by the original check result information involved in the contents; and
- a module renewal section for renewing the module to be renewed of the contents stored in said memory into the renewal module involving the correction data produced in said correction data producing section in a case where said module check step decides that the renewal module is proper.

17. A processing apparatus having an internal memory storing internal contents wherein an external memory for storing external contents is detachably mounted on said processing apparatus, for performing a processing according to the internal contents stored in said internal memory and the external contents stored in said external memory, wherein the external contents stored in said external memory involve original check result information representative of a check result associated with validity of the external contents, said processing apparatus comprising:
- a renewal module obtaining section for obtaining a renewal module involving original module check result information representative of a check result associated with validity of the renewal module, said renewal module being to be substituted for a module to be renewed which is part of the external contents stored in said memory;
- a module check section for checking the renewal module in accordance with a predetermined check algorithm to obtain a check result;
- a comparison section for comparing the check result obtained by said module check section with a check result represented by the original module check result information involved in the renewal module to decide validity of the renewal module;
- a correction data producing section for producing correction data in such a manner that a check result, in a case where the external contents stored in said external memory after the module to be renewed of the external contents stored in said external memory is renewed into the renewal module involving correction data is checked in accordance with a predetermined algorithm, is coincident with the check result represented by the original check result information involved in the external contents; and
- a module renewal section for renewing the module to be renewed of the external contents stored in said external memory into the renewal module involving the correction data produced in said correction data producing step in a case where said module check step decides that the renewal module is proper.

18. A processing apparatus according to claim 17 wherein the renewal module involves the original module check result information which is encoded, said processing apparatus further comprising:

a decoding section for decoding the encoded original module check result information.

19. A processing apparatus according to claim 18 wherein the external contents stored in said external memory involve a key for decoding the encoded original module check result information, and said decoding section decodes the encoded original module check result information by said key.

20. A processing apparatus according to claim 19 wherein the external contents stored in said external memory involve the key which is encoded, said decoding section decodes the encoded original module check result information with the key which is read from said external memory and is decoded.

* * * * *